US009671861B2

(12) United States Patent
Roh (10) Patent No.: US 9,671,861 B2
(45) Date of Patent: Jun. 6, 2017

(54) ELECTRONIC DEVICE FOR MEASURING ANGLE OF FACE AND ROTATING SCREEN THEREOF AND METHOD THEREOF

(71) Applicant: Samsung Electronics Co., Ltd, Gyeonggi-do (KR)

(72) Inventor: Young-Gil Roh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 81 days.

(21) Appl. No.: 13/684,094

(22) Filed: Nov. 21, 2012

(65) Prior Publication Data

US 2013/0234927 A1   Sep. 12, 2013

(30) Foreign Application Priority Data

Mar. 8, 2012 (KR) .................. 10-2012-0024004

(51) Int. Cl.
G06F 3/01 (2006.01)
G06K 9/00 (2006.01)
G06F 1/16 (2006.01)
G06K 9/32 (2006.01)

(52) U.S. Cl.
CPC ............ *G06F 3/011* (2013.01); *G06F 1/1643* (2013.01); *G06F 3/012* (2013.01); *G06K 9/00228* (2013.01); *G06K 9/3208* (2013.01); *G06F 2200/1614* (2013.01); *G09G 2320/0261* (2013.01); *G09G 2340/0492* (2013.01)

(58) Field of Classification Search
CPC ........ G06F 3/011; G06F 3/012; G06F 1/1643; G06F 2200/1614; G06K 9/00228; G09G 2340/0492

USPC .................................................. 345/156, 173
See application file for complete search history.

(56) References Cited

U.S. PATENT DOCUMENTS

| 8,363,145 | B2* | 1/2013 | Iwamoto | ............ H04N 5/23219 348/333.11 |
| 2004/0252913 | A1* | 12/2004 | Ahn | ...................... G06F 1/1626 382/296 |
| 2009/0239579 | A1* | 9/2009 | Lee | ....................... G06F 1/1626 455/556.1 |
| 2009/0295832 | A1* | 12/2009 | Takatsuka | ............... G06F 3/012 345/659 |
| 2011/0032220 | A1* | 2/2011 | Shih | ...................... G06F 1/1694 345/204 |
| 2011/0074822 | A1* | 3/2011 | Chang | .................. G06F 1/1626 345/649 |

(Continued)

FOREIGN PATENT DOCUMENTS

KR   10-2011-0133443 A   12/2011

OTHER PUBLICATIONS

Extended European Search Report dated May 28, 2013 in connection with European Patent Application No. 13150450.8, 7 pages.

(Continued)

*Primary Examiner* — Amare Mengistu
*Assistant Examiner* — Jennifer Zubajlo (57) ABSTRACT

An electronic device is configured to measure an angle of a user's face and rotate a screen thereof. In a method, the electronic device verifies that a face of a user is included in photographed image information, recognizes the face of the user included in the image information, and rotates a screen of the electronic device according to an angle of the recognized face.

18 Claims, 8 Drawing Sheets

(56) References Cited

U.S. PATENT DOCUMENTS

| | | | |
|---|---|---|---|
| 2011/0221667 A1* | 9/2011 | Lee | G01B 7/30 345/156 |
| 2012/0294533 A1* | 11/2012 | Ikenoue | H04N 1/3877 382/195 |
| 2013/0009867 A1* | 1/2013 | Woo | G09G 5/00 345/156 |
| 2014/0062860 A1* | 3/2014 | Lee | G06F 3/012 345/156 |
| 2014/0118256 A1* | 5/2014 | Sonoda | G06F 3/0346 345/158 |
| 2014/0320395 A1* | 10/2014 | Chi | G06F 3/013 345/156 |

OTHER PUBLICATIONS

Notice of Preliminary Rejection dated Jul. 23, 2013, in connection with Korean Patent Application No. 10-2012-0024004, 8 pages.
European Examination Report dated Aug. 5, 2016 in connection with European Patent Application No. 13150450.8, 5 pages.

\* cited by examiner

ELECTRONIC DEVICE FOR MEASURING ANGLE OF FACE AND ROTATING SCREEN THEREOF AND METHOD THEREOF

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 8, 2012 and assigned Serial No. 10-2012-0024004, the entire disclosure of which is hereby incorporated by reference.

TECHNICAL FIELD OF THE INVENTION

The present disclosure relates to an electronic device for measuring a motion of a user and rotating a screen thereof and a method thereof.

BACKGROUND OF THE INVENTION

A user-based electronic device for improving convenience of a user is being developed while functions of the electronic device are developed. For example, when a user holds the electronic device horizontally and then holds it vertically, the electronic device performs an automatic screen change (rotation) after sensing velocity, gravity, and the like, thereof and automatically changing (rotating) a screen thereof.

However, because the electronic device ascertains motion of the electronic device itself and changes the screen thereof, a change of angle of the user's face is not considered in the above-described automatic screen change method of the electronic device. For example, when the user lies down and watches the screen of the electronic device, with respect to gravity acting on the electronic device, the electronic device displays an upper surface of a screen on an opposite side of a side on which gravity acts and displays a lower surface of the screen on the side on which gravity acts. That is, because the user lies down, the user watches the screen of the electronic device at the user's right or left side at 90 degrees to the electronic device. Accordingly, the user may not watch the screen of the electronic device straight.

Therefore, a user-based electronic device for automatically ascertaining motion of a user instead of motion of the electronic device itself is needed.

SUMMARY OF THE INVENTION

To address the above-discussed deficiencies of the prior art, it is a primary object to provide at least the advantages described below. Accordingly, an aspect of the present disclosure is to provide an apparatus and method for ascertaining an angle of a user's face in real time and automatically changing a screen of an electronic device according to change of an angle of the user's face.

Another aspect of the present disclosure is to provide an apparatus and method for ascertaining motion of a user instead of motion of an electronic device itself and changing a screen of the electronic device by reflecting an angle of the user.

Another aspect of the present disclosure is to provide an apparatus and method for photographing a face of a user in real time and recognizing the face of the user based on the photographed image in an electronic device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure will be described herein below with reference to the accompanying drawings. In the following description, well-known functions or constructions are not described in detail since they would obscure the disclosure in unnecessary detail.

FIGS. 1A to 1D illustrate a smart rotation function according to one embodiment of the present disclosure.

The smart rotation function is defined as a function for rotating a screen of an electronic device such that a user watches the screen of the electronic device straight. In more detail, the electronic device photographs an image of a user. If a change of an angle of the user's face is sensed, the electronic device rotates a screen thereof in a set direction. That is, a conventional electronic device performs a conventional automatic screen change method of sensing velocity, gravity, and the like, of the device and automatically changing a screen thereof. However, as described above, because the conventional electronic device senses motion thereof and changes the screen thereof, an angle of the user changed according to an angle of the user's face is not reflected in the conventional automatic screen change method. For example, when the user lies down and watches the screen of the electronic device, with respect to gravity acting on the electronic device, the electronic device displays an upper surface of the screen on an opposite side of a side on which gravity acts and displays a lower surface of the screen on the side on which gravity acts. That is, because the user lies down, the user watches the screen of the electronic device at the user's right or left side at 90 degrees to the electronic device. Accordingly, the user may not watch the screen of the electronic device straight. However, as described above, an electronic device according to the present disclosure photographs an image of the user in real time and rotates a screen thereof in a set direction when a change of an angle of the user's face is sensed. Accordingly, the electronic device according to the present disclosure has an advantage in that convenience of the user is improved.

Figure 1A:
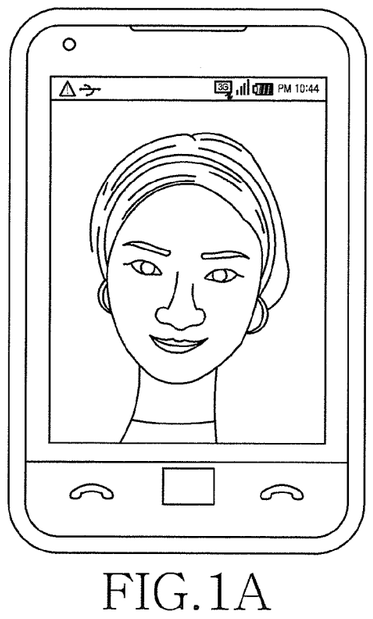
FIGS. 1A to 1D illustrate a smart rotation function according to one embodiment of the present disclosure.
Figure 1B:
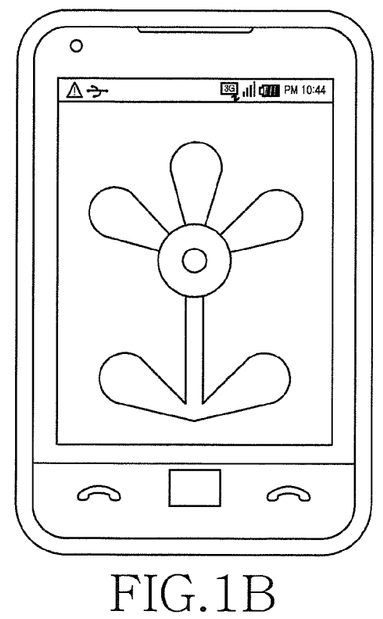
Figure 1C:
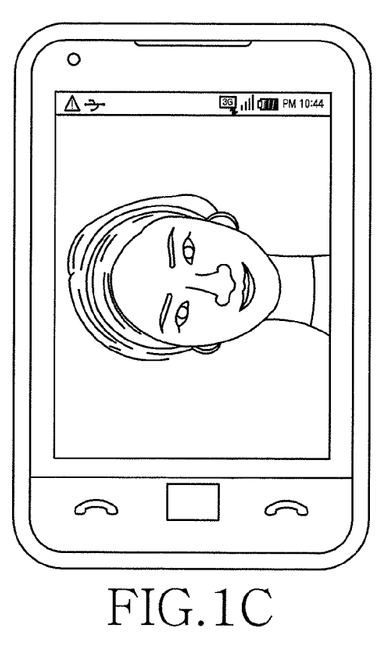
Figure 1D:
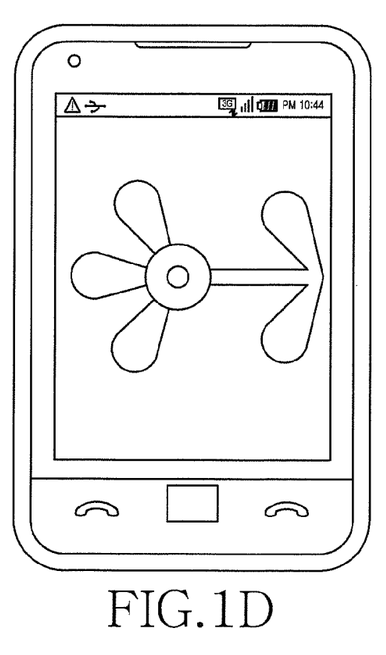

FIGS. 1A and 1C illustrate screens on which a face of a current user is photographed in order to sense a change of an angle of the user's face in an electronic device. FIGS. 1B and 1D illustrate screens which are changed according to an angle of a user's face.

As shown in FIG. 1A, the electronic device photographs the user at intervals of a set time in a direction set by the user through a camera thereof and obtains information about the user's face changed in real time. For example, it is assumed that the user sets the front of a screen of the electronic device to a direction for photographing the user and sets a photographing time to intervals of two seconds. When the user watches contents displayed on the screen of the electronic device straight and continuously, the electronic device photographs the user who is positioned at the front of the screen at intervals of two seconds which are a set time. The electronic device compares a previously obtained face of the user with a currently obtained face of the user and determines whether an angle of the user's face is changed, based on information about the face of the user obtained at intervals of two seconds. If it is determined that the angle of the user's face is changed to an angle within a set range, as shown in FIG. 1B, the electronic device does not rotate a screen which is currently displayed. However, if it is determined that the user's face is changed to an angle out of the set range, the electronic device rotates the screen which is currently displayed in the set direction.

For another example, it is assumed that the user sets the front of the screen of the electronic device to the direction for photographing the user and sets a photographing time to intervals of one second. When the user watches contents displayed on the electronic device at the left side of the screen of the electronic device in a direction of 90 degrees, the electronic device compares a previously obtained face of the user with a currently obtained face of the user and determines whether an angle of the user's face is changed, based on information about the face of the user, which is obtained at intervals of one second which is a set time. As shown in FIG. 1C, if it is determined that an angle of the user's face is changed to an angle out of a set range, as shown in FIG. 1D, the electronic device rotates a currently displayed screen in a set direction. In more detail, the electronic device senses a change of the angle of the user's face and rotates the screen of the electronic device such that the user watches the screen of the electronic device straight. Accordingly, when the user watches the screen of the electronic device at an angle which differs from a previous angle, the electronic device automatically changes the screen of the electronic device in response to a changed angle of the user. The electronic device has an advantage in that convenience of the user is improved.

Figure 2A:
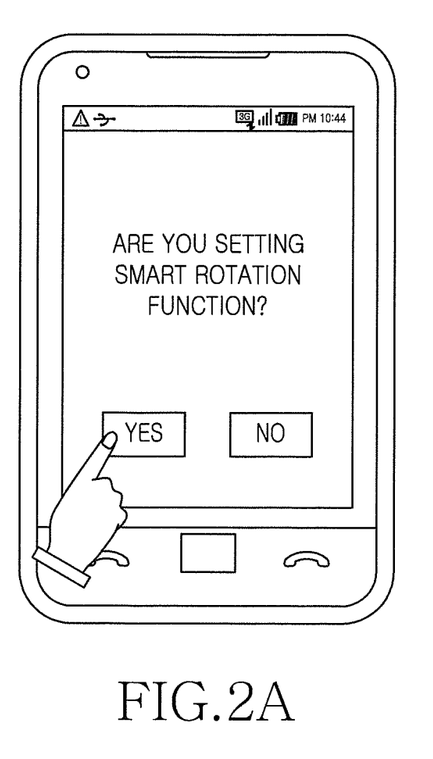
FIGS. 2A and 2B illustrate a process of setting a smart rotation function according to one embodiment of the present disclosure.
Figure 2B:
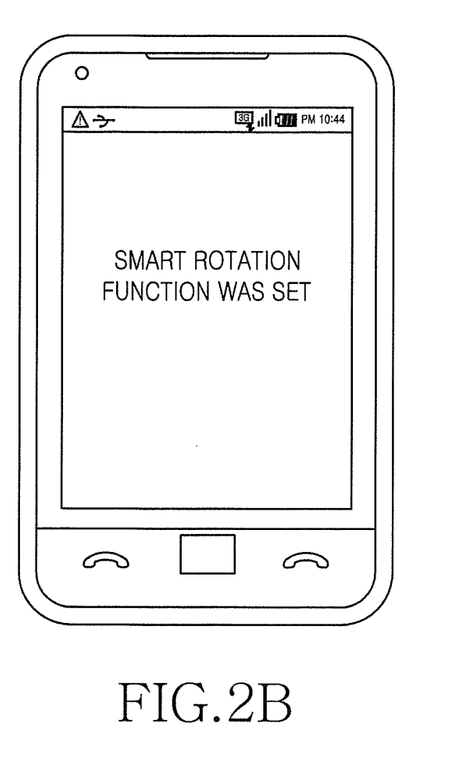

FIGS. 2A and 2B illustrate a process of setting a smart rotation function according to one embodiment of the present disclosure.

Although it is not shown in FIGS. 2A and 2B, for example, in a previous process of the process of setting the smart rotation function according to one embodiment of the present disclosure, a user selects a menu key of an electronic device and inputs a smart rotation function setting key or command. Thereafter, the electronic device may enter the process of setting the smart rotation function.

As described above, if the user inputs the smart rotation function setting key or command, as shown in FIG. 2A, the electronic device displays whether to set the smart rotation function on a touch screen thereof. If the user inputs a command for setting the smart rotation function, which is displayed on the touch screen of the electronic device, the electronic device may set the smart rotation function automatically. As shown in FIG. 2B, if the command for setting the smart rotation function is received from the user, the electronic device displays that the smart rotation function is set on the touch screen.

As described above, after the user sets the smart rotation function and verifies that the smart rotation function is set, the electronic device photographs a face of the user at intervals of time set by the user using a camera thereof. In more detail, the electronic device may perform image or video capture at intervals of a set time in a direction set by the user and may obtain an image of the user changed in real time. That is, if the smart rotation function is set by one embodiment of FIGS. 2A and 2B, in order to obtain changed image information of the user, the electronic device starts to photograph the face of the user at intervals of time set by the user.

FIGS. 2A and 2B illustrate a process of setting a smart rotation function according to one embodiment of the present disclosure. Although it is not shown in FIGS. 2A and 2B, a process of releasing settings of the smart rotation function may be performed by the above-described method of FIGS. 2A and 2B. That is, if a command for releasing settings of the smart rotation function is received from the user, the electronic device stops image or video capture performed at intervals of a set time in a direction set by the user.

Also, if the electronic device receives the command for setting the smart rotation function from the user and verifies that the smart rotation function is set, it stops operations of a gyro sensor, an acceleration sensor, and the like. In more detail, the electronic device according to one embodiment of the present disclosure does not sense gravity acting on the electronic device or acceleration of the electronic device itself but senses an angle of the user's face, and changes the screen thereof. Accordingly, the electronic device stops the operation of the gyro sensor, the acceleration sensor, and the like. Thereafter, a command for releasing settings of the smart rotation function is received from the user, the electronic device resumes operation of the gyro sensor, the acceleration sensor, and the like, which are stopped.

Figure 3A:
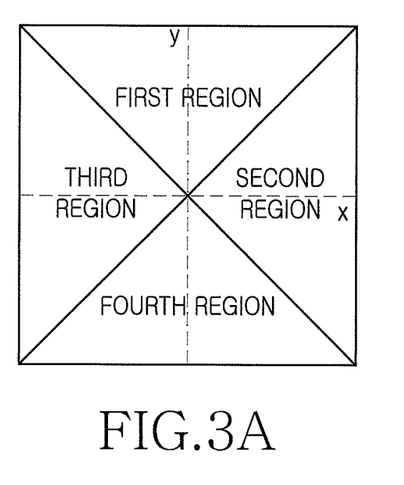
FIGS. 3A to 3C illustrate a process of measuring an angle of a user's face according to one embodiment of the present disclosure.
Figure 3B:
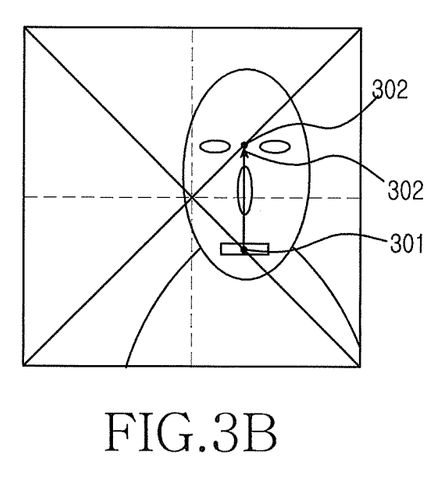
Figure 3C:
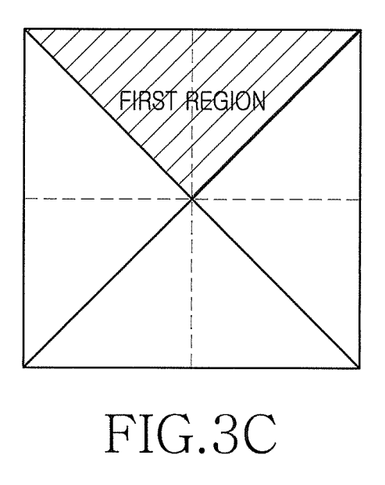

FIGS. 3A to 3C are screens illustrating a process of measuring an angle of a user's face according to one embodiment of the present disclosure.

FIG. 3A is a screen illustrating a process of setting a plane coordinate and classifying four regions according to one embodiment of the present disclosure.

As shown in FIG. 3A, an electronic device which verifies that a smart rotation function is set sets the center of a screen thereof to the origin and sets plane coordinates of the X axis and the Y axis. In more detail, the electronic device sets the center of a touch screen to the origin and sets the plane coordinates of the X axis and the Y axis on the basis of the origin which is the set center of the touch screen. The electronic device which verifies that the plane coordinates is set displays two lines which pass through the origin and have a diagonal direction with the X axis and the Y axis.

As described above, if the two lines of the diagonal direction are displayed, the plane coordinates are classified into first to fourth regions. Herein, the first region is defined as a region from plus 45 degrees to plus 135 degrees or less using the X axis of the plane coordinates as an initial line. The second region is defined as a region to plus 45 degrees or less and a region to minus 45 degrees or less using the X axis of the plane coordinates as the initial line. The third region is defined as a region from plus 135 degrees to plus 225 degrees or less or from minus 135 degrees to minus 225 degrees or less using the X axis of the plane coordinates as the initial line. The fourth region is defined as a region from minus 45 degrees to minus 135 degrees or less using the X axis of the plane coordinates as the initial line. The plane coordinates are accurately classified and shown into four regions according to one embodiment of the present disclosure. However, it is obvious that any one of the four regions may be set to a broader or narrower region according to settings of a user.

FIG. 3B is a screen illustrating a process of measuring an angle of a user's face according to one embodiment of the present disclosure.

An electronic device performs photographing of the user at intervals of a set time in a direction set by the user and obtains image information. Herein, the photographing may be image or video capture. For example, for the image capture, the electronic device may perform the image capture at intervals of time set by the user and may obtain image information. For the video capture, the electronic device may periodically obtain an image of time set by the user while performing the video capture.

As described above, the electronic device which obtains the image information performs face recognition of the user using a face recognition module thereof. Herein, face recognition means that positions of eyes, the nose, and the mouth of a face of the user included in the image information are verified. In more detail, the face recognition module verifies the positions of the eyes, the nose, and the mouth of the face of the user included in the image information and may measure an angle of the user's face.

The electronic device which verifies the positions of the eyes, the nose, and the mouth of the user and recognizes the face of the user measures the angle of the user's face using the image information. In more detail, the electronic device takes a central coordinate of a line segment which connects both end points of the lips of the recognized face as a starting point and takes a central coordinate of a line segment which connects the two eyes as an end point. The electronic device may display a virtual arrow in a direction from the starting point to the end point and may measure an angle of the user's face. A description will be given of FIG. 3B as an example. The electronic device takes a central coordinate 301 of a line segment which connects both end points of the lips of the recognized face as a starting point and takes a central coordinate 302 of a line segment which connects the two eyes as an end point. The electronic device displays a virtual arrow 303 in a direction from the starting point to the end point and measures an angle of the user's face. Thereafter, the electronic device which displays the arrow determines whether the direction of the arrow is included in any region of the first to fourth regions on the plane coordinates. That is, when the direction of an end point of the arrow is not included in the first region, the electronic device rotates a screen thereof to a corresponding region. However, as shown in FIG. 3B, when the direction of the arrow does not get out of the first region, the electronic device does not rotate the screen thereof.

FIG. 3C is a screen illustrating that a direction of an arrow is included in a first region as a result of measurement of an angle of a user's face.

In more detail, in accordance with one embodiment of the present disclosure, an electronic device verifies that the angle of the user's face is not changed as a result of measurement of the angle of the user's face. Accordingly, the electronic device does not rotate a screen thereof and measures a face's angle in a next period set by the user.

Figure 4A:
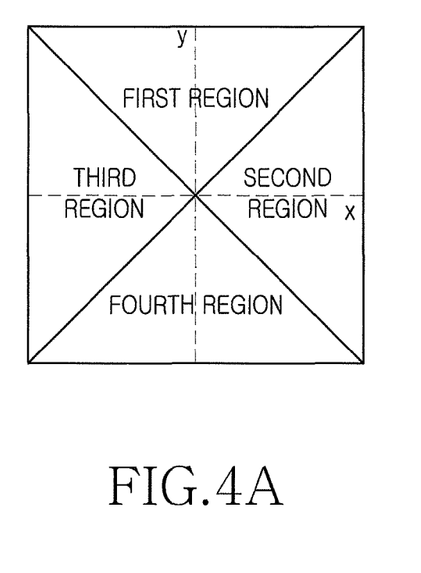
FIGS. 4A to 4C illustrate a process of measuring an angle of a user's face according to another embodiment of the present disclosure.
Figure 4B:
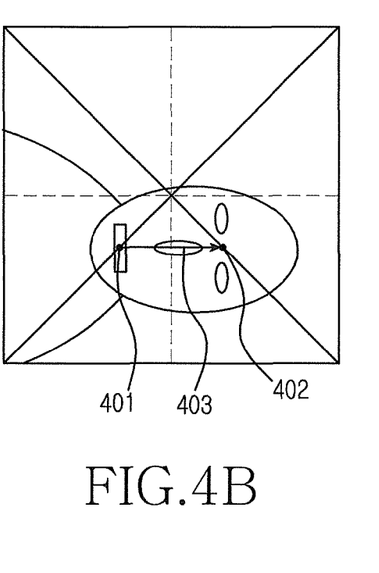
Figure 4C:
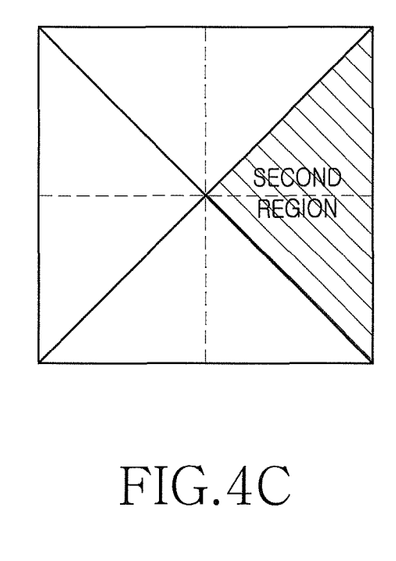

FIGS. 4A to 4C are screens illustrating a process of measuring an angle of a user's face according to another embodiment of the present disclosure.

FIG. 4A is a screen illustrating a process of setting plane coordinates and classifying four regions according to another embodiment of the present disclosure.

As shown in FIG. 4A, an electronic device which verifies that a smart rotation function is set sets the center of a screen thereof to the origin and sets plane coordinates of the X axis and the Y axis. In more detail, the electronic device sets the center of a touch screen to the origin and sets the plane coordinates of the X axis and the Y axis on the basis of the origin which is the set center of the touch screen. The electronic device which verifies that the plane coordinate is set displays two lines which pass through the origin and have a diagonal direction with the X axis and the Y axis.

As described above, if the two lines of the diagonal direction are displayed, the plane coordinates are classified into first to fourth regions. Herein, the first region is defined as a region from plus 45 degrees to plus 135 degrees or less using the X axis of the plane coordinates as an initial line. The second region is defined as a region to plus 45 degrees or less and a region to minus 45 degrees or less using the X axis of the plane coordinates as the initial line. The third region is defined as a region from plus 135 degrees to plus 225 degrees or less or from minus 135 degrees to minus 225 degrees or less using the X axis of the plane coordinates as the initial line. The fourth region is defined as a region from minus 45 degrees to minus 135 degrees or less using the X axis of the plane coordinates as the initial line. The plane coordinates are accurately classified and shown into four regions according to another embodiment of the present disclosure. However, it is obvious that any one of the four regions may be set to a broader or narrower region according to settings of a user.

FIG. 4B is a screen illustrating a process of measuring an angle of a user's face according to another embodiment of the present disclosure.

An electronic device performs photographing of the user at intervals of a set time in a direction set by the user using a camera thereof and obtains image information. Herein, the photographing may be image or video capture. For example, for the image capture, the electronic device may perform the image capture at intervals of time set by the user and may obtain image information. For the video capture, the electronic device may periodically obtain an image at a time set by the user while performing the video capture.

As described above, the electronic device which obtains the image information performs face recognition of the user using a face recognition module thereof. Herein, the face recognition means that positions of eyes, the nose, and the mouth of a face of the user included in the image information are verified. In more detail, the face recognition module verifies the positions of the eyes, the nose, and the mouth of the face of the user included in the image information and may measure an angle of the user's face.

The electronic device which verifies the positions of the eyes, the nose, and the mouth of the user and recognizes the face of the user measures the angle of the user's face using the image information. In more detail, the electronic device takes a central coordinate of a line segment which connects both end points of the lips of the recognized face as a starting point and takes a central coordinate of a line segment which connects the two eyes as an end point. The electronic device may display a virtual arrow in a direction from the starting point to the end point and may measure an angle of the user's face. A description will be given of FIG. 4B as an example. The electronic device takes a central coordinate 401 of a line segment which connects both end points of the lips of the recognized face as a starting point and takes a central coordinate 402 of a line segment which connects the two eyes as an end point. The electronic device displays a virtual arrow 403 in a direction from the starting point to the end point and measures an angle of the user's face. Thereafter, the electronic device which displays the arrow determines whether the direction of the arrow is included in any region of the first to fourth regions on the plane coordinates. That is, when the direction of an end point of the arrow does not get out of the first region, the electronic device does not rotate a screen thereof. However, when the direction of the end point of the arrow is not included in the first region, the electronic device rotates the screen thereof to a corresponding region. As shown in FIG. 4B, when the end point of the arrow is toward a region including the second region, the electronic device rotates the screen thereof to the right on the basis of the user. For example, when the user sits and watches the screen of the electronic device and then watches it continuously in a state where the user lies on the right side of the user, if a set period arrives, the electronic device photographs the face of the user.

Thereafter, if an angle of the user's face included in the photographed image information is measured, as shown in FIG. 4B, the electronic device verifies that the direction of the arrow is included in the second region and rotates the screen thereof to the left. That is, the electronic device rotates the screen thereof to the right on the basis of the user. The electronic device has an advantage in that the user may continuously watch the screen of the device because the screen is rotated in a correct direction relative to the direction in which the user lies.

FIG. 4C is a screen illustrating that the direction of an arrow is included in a second region as a result of measurement of an angle of a user's face.

In more detail, in accordance with another embodiment of the present disclosure, an electronic device verifies that the angle of the user's face is changed as a result of measurement of the angle of the user's face. Accordingly, the electronic device rotates a screen thereof to the left and measures a face's angle in a next period set by the user.

Figure 5A:
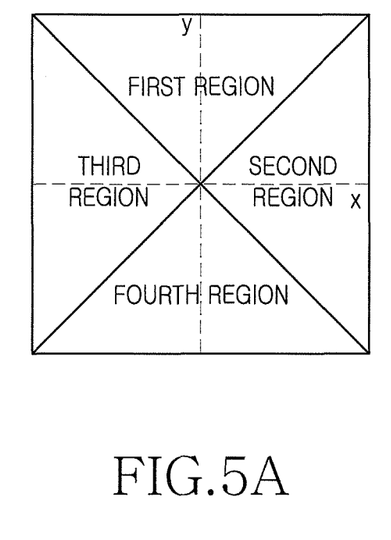
FIGS. 5A to 5C illustrate a process of measuring an angle of a user's face according to yet another embodiment of the present disclosure.
Figure 5B:
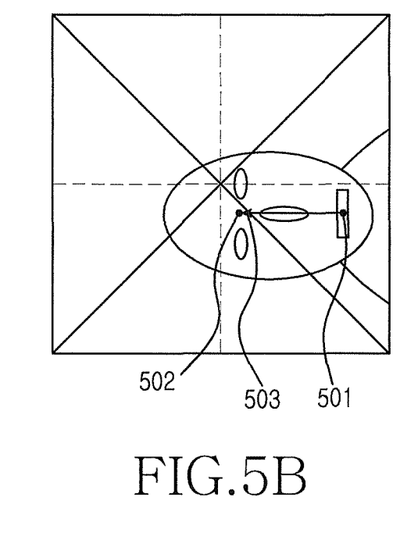
Figure 5C:
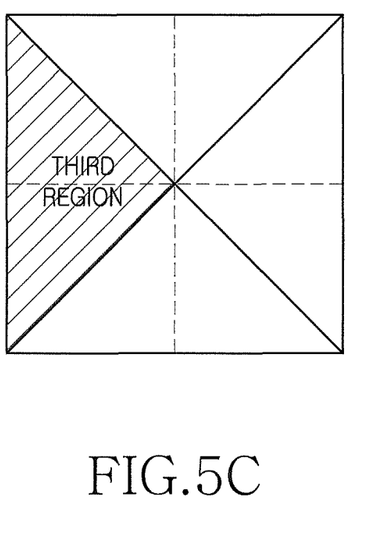

FIGS. 5A to 5C are screens illustrating a process of measuring an angle of a user's face according to another embodiment of the present disclosure.

FIG. 5A is a screen illustrating a process of setting plane coordinates and classifying four regions according to another embodiment of the present disclosure.

As shown in FIG. 5A, an electronic device which verifies that a smart rotation function is set sets the center of a screen thereof to the origin and sets plane coordinates of the X axis and the Y axis. In more detail, the electronic device sets the center of a touch screen thereof to the origin and sets the plane coordinates of the X axis and the Y axis on the basis of the origin which is the set center of the touch screen. The electronic device which verifies that the plane coordinate is set displays two lines which pass through the origin and have a diagonal direction with the X axis and the Y axis.

As described above, if the two lines of the diagonal direction are displayed, the plane coordinates are classified into first to fourth regions. Herein, the first region is defined as a region from plus 45 degrees to plus 135 degrees or less using the X axis of the plane coordinates as an initial line. The second region is defined as a region to plus 45 degrees or less and a region to minus 45 degrees or less using the X axis of the plane coordinates as the initial line. The third region is defined as a region from plus 135 degrees to plus 225 degrees or less or from minus 135 degrees to minus 225 degrees or less using the X axis of the plane coordinates as the initial line. The fourth region is defined as a region from minus 45 degrees to minus 135 degrees or less using the X axis of the plane coordinates as the initial line. The plane coordinates are accurately classified and shown into four regions according to another embodiment of the present disclosure. However, it is obvious that any one of the four regions may be set to a broader or narrower region according to settings of a user.

FIG. 5B is a screen illustrating a process of measuring an angle of a user's face according to another embodiment of the present disclosure.

An electronic device performs photographing of the user at intervals of a set time in a direction set by the user using a camera thereof and obtains image information. Herein, the photographing may be image or video capture. For example, for the image capture, the electronic device may perform the image capture at intervals of time set by the user and may obtain image information. For the video capture, the electronic device may periodically obtain an image at a time set by the user while performing the video capture.

As described above, the electronic device which obtains the image information performs face recognition of the user using a face recognition module thereof. Herein, the face recognition means that positions of eyes, the nose, and the mouth of a face of the user included in the image information are verified. In more detail, the face recognition module verifies the positions of the eyes, the nose, and the mouth of the face of the user included in the image information and may measure an angle of the user's face.

The electronic device which verifies the positions of the eyes, the nose, and the mouth of the user and recognizes the face of the user measures the angle of the user's face using the image information. In more detail, the electronic device takes a central coordinate of a line segment which connects both end points of the lips of the recognized face as a starting point and takes a central coordinate of a line segment which connects the two eyes as an end point. The electronic device may display a virtual arrow in a direction from the starting point to the end point and may measure an angle of the user's face. A description will be given of FIG. 5B as an example. The electronic device takes a central coordinate 501 of a line segment which connects both end points of the lips of the recognized face as a starting point and takes a central coordinate 502 of a line segment which connects the two eyes as an end point. The electronic device displays a virtual arrow 503 in a direction from the starting point to the end point and measures an angle of the user's face. Thereafter, the electronic device which displays the arrow determines whether the direction of the arrow is included in any region of the first to fourth regions on the plane coordinates. That is, when the direction of an end point of the arrow does not get out of the first region, the electronic device does not rotate the screen thereof. However, when the direction of the end point of the arrow is not included in the first region, the electronic device rotates a screen thereof to a corresponding region. However, as shown in FIG. 5B, when the end point of the arrow is toward a region including the third region, the electronic device rotates the screen thereof to the left on the basis of the user. For example, when the user sits and watches the screen of the electronic device and then watches it continuously in a state where the user lies on the left side of the user, if a set period arrives, the electronic device photographs the face of the user.

Thereafter, if an angle of the user's face included in the photographed image information is measured, as shown in FIG. 5B, the electronic device verifies that the direction of the arrow is included in the third region and rotates the screen to the right. That is, the electronic device rotates the screen to the left on the basis of the user. The electronic device has an advantage in that the user may continuously watch the screen because the screen is rotated in a correct direction relative to the direction in which the user lies.

FIG. 5C is a screen illustrating that the direction of an arrow is included in a third region as a result of measurement of an angle of a user's face.

In more detail, in accordance with another embodiment of the present disclosure, an electronic device verifies that the angle of the user's face is changed as a result of measurement of the angle of the user's face. Accordingly, the electronic device rotates a screen thereof to the right and measures a face's angle in a next period set by the user.

Figure 6A:
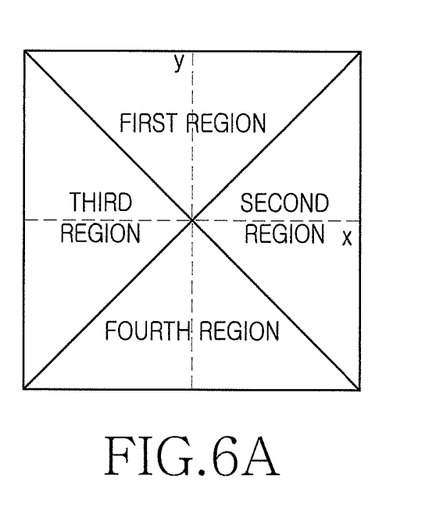
FIGS. 6A to 6C illustrate a process of measuring an angle of a user's face according to still another embodiment of the present disclosure.
Figure 6B:
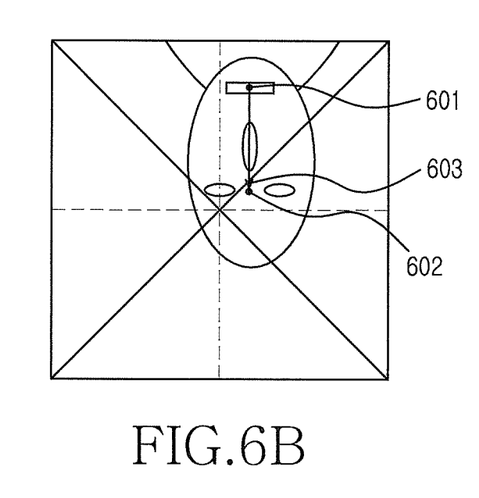
Figure 6C:
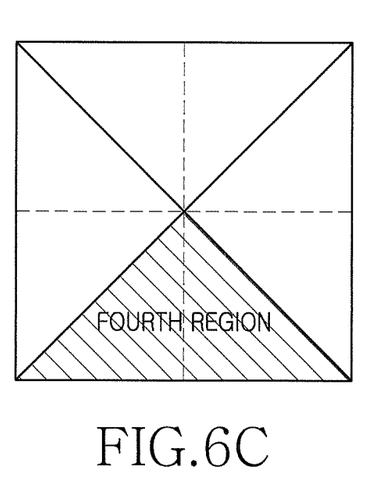

FIGS. 6A to 6C are screens illustrating a process of measuring an angle of a user's face according to another embodiment of the present disclosure.

FIG. 6A is a screen illustrating a process of setting plane coordinates and classifying four regions according to another embodiment of the present disclosure.

As shown in FIG. 6A, an electronic device which verifies that a smart rotation function is set sets the center of a screen thereof to the origin and sets plane coordinates of the X axis and the Y axis. In more detail, the electronic device sets the center of a touch screen thereof to the origin and sets the plane coordinates of the X axis and the Y axis on the basis of the origin which is the set center of the touch screen. The electronic device which verifies that the plane coordinate is set displays two lines which pass through the origin and have a diagonal direction with the X axis and the Y axis.

As described above, if the two lines of the diagonal direction are displayed, the plane coordinates are classified into first to fourth regions. Herein, the first region is defined as a region from plus 45 degrees to plus 135 degrees or less using the X axis of the plane coordinates as an initial line. The second region is defined as a region to plus 45 degrees or less and a region to minus 45 degrees or less using the X axis of the plane coordinates as the initial line. The third region is defined as a region from plus 135 degrees to plus 225 degrees or less or from minus 135 degrees to minus 225 degrees or less using the X axis of the plane coordinates as the initial line. The fourth region is defined as a region from minus 45 degrees to minus 135 degrees or less using the X axis of the plane coordinates as the initial line. The plane coordinates are accurately classified and shown into four regions according to another embodiment of the present disclosure. However, it is obvious that any one of the four regions may be set to a broader or narrower region according to settings of a user.

FIG. 6B is a screen illustrating a process of measuring an angle of a user's face according to another embodiment of the present disclosure.

An electronic device performs photographing of the user at intervals of a set time in a direction set by the user using a camera thereof and obtains image information. Herein, the photographing may be image or video capture. For example, for the image capture, the electronic device may perform the image capture at intervals of time set by the user and may obtain image information. For the video capture, the electronic device may periodically obtain an image at a time set by the user while performing the video capture.

As described above, the electronic device which obtains the image information performs face recognition of the user using a face recognition module thereof. Herein, the face recognition means that positions of eyes, the nose, and the mouth of a face of the user included in the image information are verified. In more detail, the face recognition module verifies the positions of the eyes, the nose, and the mouth of the face of the user included in the image information and may measure an angle of the user's face.

The electronic device which verifies the positions of the eyes, the nose, and the mouth of the user and recognizes the face of the user measures the angle of the user's face using the image information. In more detail, the electronic device takes a central coordinate of a line segment which connects both end points of the lips of the recognized face as a starting point and takes a central coordinate of a line segment which connects the two eyes as an end point. The electronic device may display a virtual arrow in a direction from the starting point to the end point and may measure an angle of the user's face. A description will be given of FIG. 6B as an example. The electronic device takes a central coordinate 601 of a line segment which connects both end points of the lips of the recognized face as a starting point and takes a central coordinate 602 of a line segment which connects the two eyes as an end point. The electronic device displays a virtual arrow 603 in a direction from the starting point to the end point and measures an angle of the user's face. Thereafter, the electronic device which displays the arrow determines whether the direction of the arrow is included in any region of the first to fourth regions on the plane coordinates. That is, when the direction of an end point of the arrow does not get out of the first region, the electronic device does not rotate a screen thereof. However, when the direction of the end point of the arrow is not included in the first region, the electronic device rotates the screen thereof to a corresponding region. As shown in FIG. 6B, when the end point of the arrow is toward a region including the fourth region, the electronic device rotates the screen thereof to the lower side on the basis of the user. This example may be used when several persons watch a screen of one electronic device on a table and then another person watches it at an upper side on the basis of the screen which is currently displayed. That is, in the above-described example in a conventional electronic device, the user must rotate the conventional electronic device 180 degrees to watch it. However, for the electronic device having the smart rotation function of the present disclosure, it is unnecessary for the user to rotate the electronic device 180 degrees to watch it. If a face of the user is approached to a camera of the electronic device, the electronic device recognizes the face of the user and rotates the screen 180 degrees to improve convenience of the user.

FIG. 6C is a screen illustrating that the direction of an arrow is included in a fourth region as a result of measurement of an angle of a user's face.

In more detail, in accordance with another embodiment of the present disclosure, an electronic device verifies that the angle of the user's face is changed as a result of measurement of the angle of the user's face. Accordingly, the electronic device rotates a screen thereof to the lower side and measures a face's angle at a next period set by the user.

Figure 7:
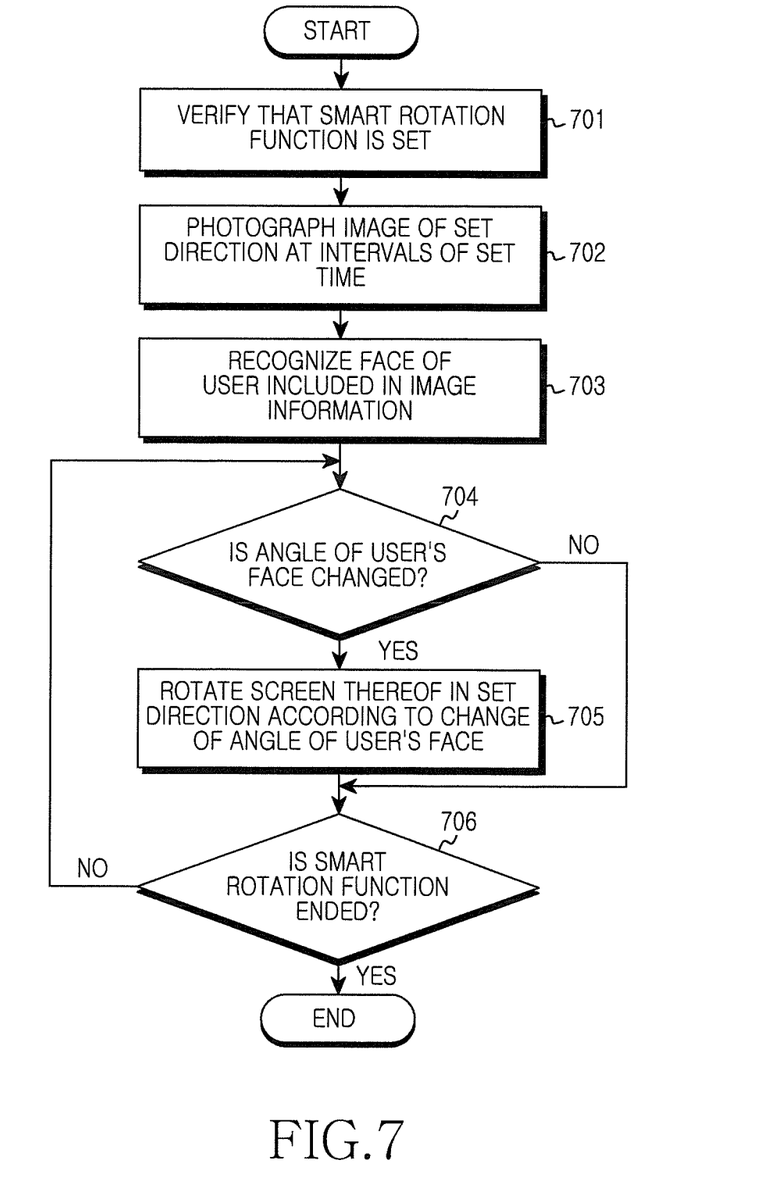
FIG. 7 is a flowchart illustrating an operation process of an electronic device according to one embodiment of the present disclosure.

FIG. 7 is a flow chart illustrating an operation process of an electronic device according to one embodiment of the present disclosure.

As shown in FIG. 7, the electronic device verifies that a smart rotation function is set (block 701). In more detail, the electronic device receives settings of the smart rotation function from a user and verifies that the smart rotation function is set. Herein, the smart rotation function is defined as a function for rotating a screen of the electronic device such that the user watches the screen of the electronic device straight. In more detail, the electronic device photographs the user in real time. If a change of an angle of the user's face is sensed, the electronic device rotates the screen thereof in a set direction.

However, a conventional electronic device senses velocity, gravity, and the like, and performs a conventional automatic screen change method of automatically changing a screen thereof. That is, as described above, the electronic device senses motion thereof and changes the screen thereof. Accordingly, a change of an angle of the user changed according to an angle of the user's face is not reflected in the conventional automatic screen change method. For example, when the user lies down and watches the screen of the electronic device, the electronic device displays an upper surface of the screen on an opposite side of a side on which gravity thereof acts and displays a lower surface of the screen on the side on which gravity thereof acts. That is, because the user lies down, the user watches the screen of the electronic device at the right or left side of the user at 90 degrees to the electronic device. Accordingly, the user may not watch the screen of the electronic device straight. However, as described above, the electronic device according to one embodiment of the present disclosure photographs an image of the user. If a change of an angle of the user's face is sensed, the electronic device rotates the screen thereof in a set direction to improve convenience of the user.

The electronic device which verifies that the smart rotation function is set photographs an image of a set direction at intervals of a set time (block 702). In more detail, the electronic device photographs the image of the user at intervals of the set time in the direction set by the user and obtains information about a face of the user changed in real time, through a camera thereof. For example, it is assumed that the user sets the front of a screen of the electronic device to a direction for photographing the user and sets a photographing time to intervals of two seconds. When the user watches contents displayed on the screen of the electronic device straight and continuously, the electronic device photographs the user who is positioned in front of the screen at intervals of two seconds. The electronic device compares a previously obtained face of the user with a currently obtained face of the user and determines whether an angle of the user's face is changed, based on information about the face of the user obtained at intervals of two seconds. If it is determined that the angle of the user's face is changed to an angle within a set range, the electronic device does not rotate a screen which is currently displayed. However, if it is determined that the angle of the user's face is changed to an angle out of the set range, the electronic device rotates the screen which is currently displayed in the set direction.

The electronic device which photographs the image of the set direction at intervals of the set time recognizes the face of the user included in the image information (block 703). In more detail, the electronic device which obtains the image information performs face recognition of the user using a face recognition module thereof. Herein, the face recognition means that the electronic device verifies positions of eyes, the nose, and the mouth of the face of the user included in the image information. In more detail, the face recognition module verifies the positions of the eyes, the nose, and the mouth of the face of the user included in the image information and may measure an angle of the user's face.

The electronic device which recognizes the face of the user included in the image information determines whether an angle of the user's face is changed (block 704). In more detail, the electronic device takes a central coordinate of a line segment which connects both end points of the lips of the recognized face as a starting point and takes a central coordinate of a line segment which connects the two eyes as an end point. The electronic device may display a virtual arrow in a direction from the starting point to the end point and may measure an angle of the user's face. Thereafter, the electronic device which displays the arrow determines whether a direction of the arrow is included in any region of first to fourth regions on plane coordinates. Herein, the first region is defined as a region from plus 45 degrees to plus 135 degrees or less using the X axis of the plane coordinates as an initial line. The second region is defined as a region to plus 45 degrees or less and a region to minus 45 degrees or less using the X axis of the plane coordinates as the initial line. The third region is defined as a region from plus 135 degrees to plus 225 degrees or less from minus 135 degrees to minus 225 degrees or less using the X axis of the plane coordinates as the initial line. The fourth region is defined as a region from minus 45 degrees to minus 135 degrees or less using the X axis of the plane coordinates as the initial line. The plane coordinates are accurately classified and shown into four regions according to one embodiment of the present disclosure. However, it is obvious that any one of the four regions may be set to a broader or narrower region according to settings of a user.

If it is determined that the angle of the user's face is changed, the electronic device rotates the screen thereof in the set direction according to the change of the angle of the user's face (block 704). For example, the electronic device measures the angle of the user's face included in the photographed image information. If it is verified that the direction of the arrow is included in the second region, the electronic device rotates the screen thereof to the left. That is, the electronic device rotates the screen thereof to the right on the basis of the user. The electronic device has an advantage in that the user may continuously watch the screen because the screen is automatically rotated in a right direction in which the face of the user is angled to the right.

Thereafter, the electronic device determines whether the smart rotation function is ended (block 705). In more detail, the electronic device determines the angle of the user's face at intervals of time set by the user continuously until input for releasing the smart rotation function is received from the user.

If it is verified that the input for releasing the smart rotation function is received from the user, the electronic device ends the process of the smart rotation function. However, it is verified that the input for releasing the smart rotation function is not received from the user, the electronic device repeats the processing after block 704 of determining whether the angle of the user's face is changed. Alternatively, if it is determined that the angle of the user's face is not changed in block 704, the electronic device repeats the processing after block 706 of determining whether input for releasing the smart rotation function is received.

Figure 8:
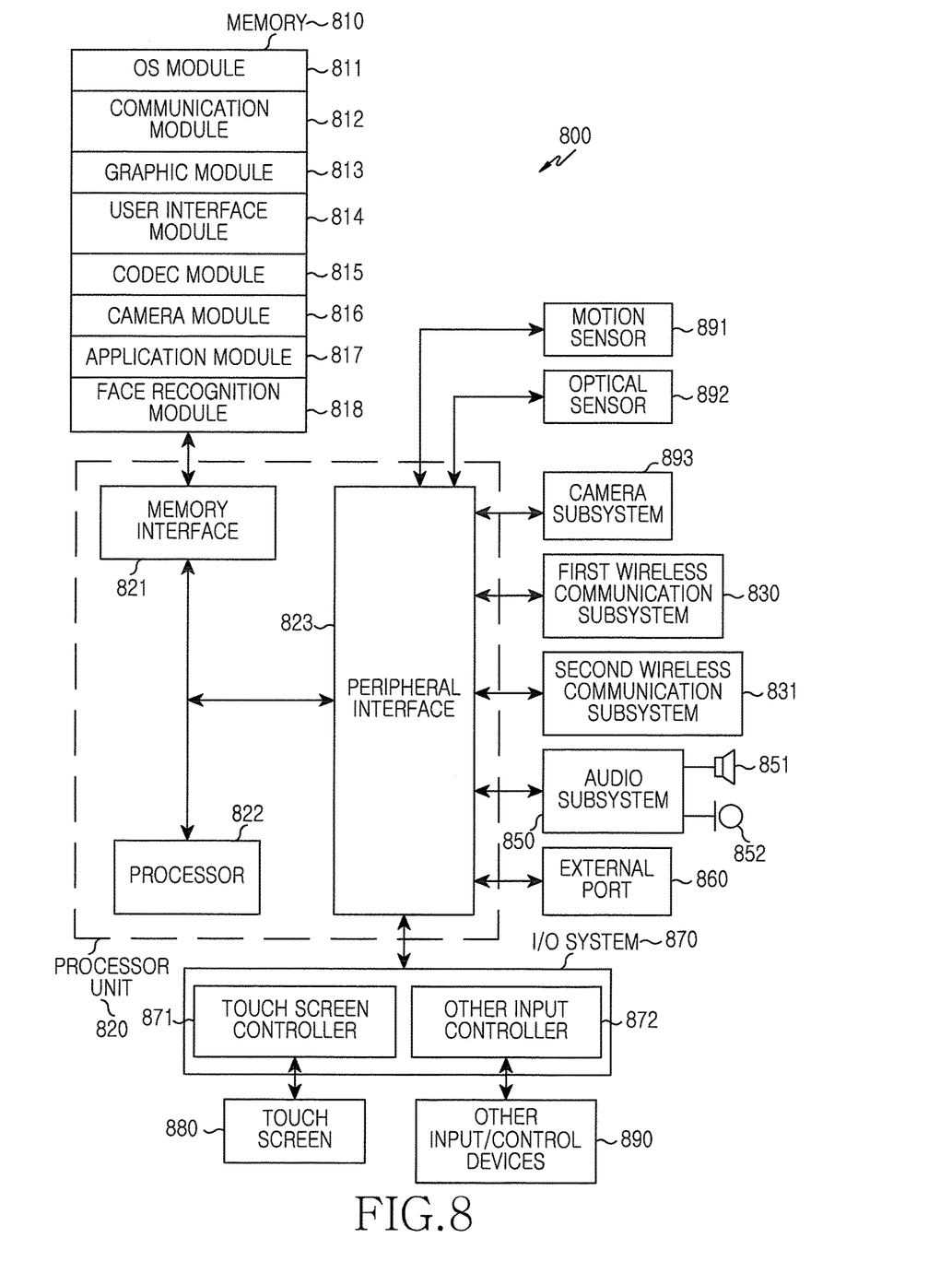
FIG. 8 is a block diagram illustrating configuration of an electronic device according to one embodiment of the present disclosure.

FIG. 8 is a block diagram illustrating a configuration of an electronic device according to one embodiment of the present disclosure.

The electronic device denoted by 800 may be a portable electronic device. The electronic device may be a portable terminal, a mobile phone, a mobile pad, a media player, a tablet computer, a handheld computer, or a Personal Digital Assistant (PDA). Also, the electronic device may be a certain portable electronic device including a device in which two or more functions are combined among these devices.

This electronic device 800 includes a memory 810, a processor unit 820, a first wireless communication subsystem 830, a second wireless communication subsystem 831, an external port 860, an audio subsystem 850, a speaker 851, a microphone 852, an Input/Output (I/O) system 870, a touch screen 880, other input/control devices 890, a motion sensor 891, an optical sensor 892, and a camera subsystem 893. The memory 810 and the external port 860 may be a plurality of memories and external ports, respectively.

The processor unit 820 may include a memory interface 821, one or more processors 822, and a peripheral interface 823. In some embodiments, the whole processor unit 820 is referred to as a processor. In accordance with one embodiment of the present disclosure, the processor unit 820 verifies whether a face of a user is included in photographed image information, recognizes the face of the user included in the image information, and rotates a screen of the electronic device according to an angle of the recognized face. Also, the processor unit 820 verifies whether a smart rotation function is set. If it is verified that the smart rotation function is set, the processor unit 820 stops operations of a gyro sensor and an acceleration sensor and verifies that the smart rotation function is set. Also, the processor unit 820 sets the center of the screen to the origin and sets plane coordinates of the X axis and the Y axis. The processor unit 820 classifies the plane coordinates into a first region to a fourth region which are set four regions. The processor unit 820 takes a central coordinate of a line segment which connects both end points of the lips of the recognized face as a starting point and takes a central coordinate of a line segment which connects the two eyes of the recognized face as an end point. The processor unit 820 displays a virtual arrow in a direction from the starting point to the end point and rotates the screen of the electronic device according to the direction of the arrow.

The processor 822 executes several software programs and performs several functions for the electronic device 800. Also, the processor 822 performs process and control for voice communication and data communication. Also, the processor 822 executes a specific software module (command set) stored in the memory 810 and plays a role in performing several specific functions corresponding to the software module. That is, the processor 822 interworks with the software modules stored in the memory 810 and performs the method according to one embodiment of the present disclosure.

The processor 822 may include one or more data processors, an image processor, or a codec. The processor 822 may separately include the data processors, the image processor, or the codec. Also, the processor 822 may include several processors for performing different functions. The peripheral interface 823 connects the I/O system 870 and several peripheral devices to the processor 822 and the memory 810 (though the memory interface 821).

A variety of components of the electronic device 800 may be coupled by one or more communication buses or stream lines.

The external port 860 is used to connect a portable electronic device (not shown) to another electronic device directly or connect it to another electronic device indirectly through a network (e.g., the Internet, an intranet, a wireless Local Area Network (LAN), and the like). For example, the external port 860 may include, but is not limited to, a Universal Serial Bus (USB) port or a firewire port.

The motion sensor 891 and the optical sensor 892 may connect to the peripheral interface 823 and may perform several functions. For example, the motion sensor 891 and the optical sensor 892 may connect to the peripheral interface 823, may sense motion of the electronic device 800, and may sense light from the outside. Furthermore, a position measurement system and other sensors such as a temperature sensor, a bio-sensor, and the like, may connect to the peripheral interface 823 and may perform related functions.

The camera subsystem 893 may perform a camera function like a photo and video clip recording function.

The optical sensor 892 may be a Charge Coupled Device (CCD) or a Complementary Metal-Oxide Semiconductor (CMOS) device.

A communication function is performed through the first and second wireless communication subsystems 830 and 831. Each of the first and second wireless communication subsystems 830 and 831 may include a radio frequency received and transceiver and/or a beam (e.g., infrared ray) receiver and transceiver. The first communication subsystem 830 and the second communication subsystem 831 may be classified according to a communication network through which the electronic device 800 communicates. For example, the communication network may be, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, or a Bluetooth network. Each of the first and second communication subsystems 830 and 831 may include a communication subsystem designed to be operated through the communication network. Herein, in accordance with one embodiment of the present disclosure, because it is necessary to perform WiFi communication through the Wi-Fi network, one of the first and second wireless communication subsystems 830 and 831 may be operated through the Wi-Fi network. The first and second wireless communication subsystems 830 and 831 may be combined and configured as one wireless communication subsystem.

The audio subsystem 850 may connect to the speaker 851 and the microphone 852 and may be responsible for inputting and outputting an audio stream, such as a voice recognition function, a voice copy function, a digital recording function, and a phone call function. That is, the audio subsystem 850 communicates with a user through the speaker 851 and the microphone 852. The audio subsystem 850 receives a data stream through the peripheral interface 823 of the processor unit 820 and converts the received data stream into an electric stream. The converted electric stream is transmitted to the speaker 851. The speaker 851 converts the electric stream into a sound wave to which a user may listen and outputs the converted sound wave. The microphone 852 converts a sound wave transmitted from the user or other sound sources into an electric stream. The audio subsystem 850 receives the converted electric stream from the microphone 852. The audio subsystem 850 converts the received electric stream into an audio data stream and transmits the converted audio data stream to the peripheral interface 823. The audio subsystem 850 may include an attachable and detachable earphone, headphone, or headset.

The I/O system 870 may include a touch screen controller 871 and/or other input controllers 872. The touch screen controller 871 may be coupled to the touch screen 880. The touch screen 880 and the touch screen controller 871 may detect, but is not limited to, contact and motion or the cessation thereof using not only capacitive, resistive, infrared ray, and surface acoustic wave technologies for determining one or more contact points, but also multi-touch sensing technology including other proximity sensor arrangement or other elements. The other input controllers 872 may be coupled to the other input/control devices 890. The other input/control devices 890 may be pointer devices such as one or more buttons, a rocker switch, a thumbwheel, a dial, a stick, and/or a stylus.

The touch screen 880 provides an input/output interface between the electronic device 800 and the user. That is, the touch screen 880 transmits a touch input of the user to the electronic device 800. Also, the touch screen 880 is a medium for displaying output from the electronic device 800 to the user. That is, the touch screen 880 displays visual output to the user. This visual output may include text, graphics, video, and any combined thereof.

The touch screen 880 may be any of several displays. For example, the touch screen 880 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 810 may be coupled to the memory interface 821. The memory 810 may include a high-speed Random Access Memory (RAM) such as one or more magnetic storages, a non-volatile memory, one or more optical storages, and/or a flash memory (e.g., a NAND flash memory or a NOR flash memory).

The memory 810 stores software components. The software components include an Operating System (OS) module 811, a communication module 812, a graphic module 813, a user interface module 814, a CODEC module 815, a camera module 816, one or more application modules 817, a face recognition module 818, and the like. Also, the modules which are the software components may be expressed in a set of instructions. Accordingly, the modules are expressed in an instruction set. Also, the modules are expressed in programs.

The OS module 811 (e.g., embedded OS such as Windows, Linux, Darwin, RTXC, UNIX, OS X, or VxWorks) includes several software components for controlling a general system operation. For example, control of this general system operation means memory management and control, storage hardware (device) control and management, power control and management, and the like. This OS module 811 also performs a function for smoothly communicating between several hardware (devices) and software components (modules).

The communication module 812 may communicate with other electronic devices such as a computer, a server, and/or a portable terminal through the first and second wireless communication subsystems 830 and 831 or the external port 860.

The graphic module 813 includes several software components for providing and displaying graphics on the touch screen 880. The term "graphics" means texts, web pages, icons, digital images, videos, animations, and the like, are included. The touch screen 880 according to one embodiment of the present disclosure displays a message about whether the smart rotation function is set and allows a user to select a certain region included in the message.

The user interface module 814 includes several software components related to a user interface. The user interface module 814 includes contents about whether a state of a user interface is changed to any state, whether a state of a user interface is changed in any condition, and the like.

The CODEC module 815 may include software components related to encoding and decoding of video files. The CODEC module 815 may include a video stream module such as an MPEG module and/or an H204 module. Also, the CODEC module 815 may include a code module for several audio files such as AAA files, AMR files, and WMA files. Also, the CODEC module 815 includes an instruction set corresponding to one embodiment of the present disclosure.

The camera module 816 includes camera-related software components capable of performing camera-related processes and functions.

The application module 817 includes a browser function, an email function, an instant message function, a word processing function, a keyboard emulation function, an address book function, a touch list function, a widget function, a Digital Right Management (DRM) function, a voice recognition function, a voice copy function, a position determining function, a location based service function, and the like.

The face recognition module 818 verifies positions of eyes, the nose, and the mouth of the user. The memory 810 may include additional modules (commands) in addition to the above-described modules. Also, if necessary, the memory 810 may not use some modules (commands).

A variety of functions of the electronic device 800, which are described above or to be described later, may be executed by one or more streaming processing, hardware including an Application Specific Integrated Circuit (ASIC), software, and/or combination of them.

It will be appreciated that embodiments of the present disclosure according to the claims and description in the specification can be realized in the form of hardware, software or a combination of hardware and software. Any such software may be stored in a computer readable storage medium. The computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An operation method of an electronic device, the operation method comprising:
    obtaining image information at intervals of a predetermined time, the predetermined time set by a user, while content is displayed in a first direction in a screen of the electronic device;
    identifying at least two areas in the image information, the at least two areas defined based on at least one line which pass through an origin point of the image information;
    identifying a face included in the image information using the image information obtained at a first interval;
    identifying a change for an angle of the face;
    identifying a first area that includes the face among the at least two areas;
    determining whether the face is positioned outside of the first area using the image information obtained at a second interval;
    maintaining the content displayed in the first direction if the angle of the face is changed within the first area, when the face is identified among the at least two areas; and
    changing the content displayed in the first direction to a second direction if the angle of the face is changed within a second area, when the face is not identified among the at least two areas.

2. The operation method of claim 1, further comprising:
    displaying a message about whether a smart rotation function is set;
    allowing the user to select a certain region included in the message; and
    verifying that the smart rotation function is set.

3. The operation method of claim 2, further comprising verifying that the smart rotation function is set and stopping operations of a gyro sensor and an acceleration sensor.

4. The operation method of claim 3, wherein the smart rotation function is a function for rotating the screen of the electronic device, such that the user watches the screen straight.

5. The operation method of claim 2, wherein the smart rotation function is a function for rotating the screen of the electronic device, such that the user watches the screen straight.

6. The operation method of claim 1, further comprising:
    verifying that a smart rotation function is set; and
    photographing an image to obtain the image information in a predetermined direction.

7. The operation method of claim 1, wherein the identification of the face included in the image information comprises verifying positions of one or more eyes, a nose, or a mouth of the face.

8. The operation method of claim 1, wherein the identification of the change for the angle of the face comprises;
    taking a central coordinate of a line segment which connects both end points of lips of the identified face as a starting point, taking a central coordinate of a line segment which connects two eyes of the identified face as an end point, and displaying a virtual arrow in a direction from the starting point to the end point; and detecting a direction of the virtual arrow.

9. The operation method of claim 8, wherein the changing of the content displayed in the first direction to the second direction comprises:
    determining whether the direction of the virtual arrow is included in the first area,
    not rotating the content in the screen when the direction of the virtual arrow is included in the first area, and
    rotating the content in the screen when the direction of the virtual arrow is included in the second area.

10. An electronic device comprising:
    a memory;
    a processor unit coupled to the memory, the processor unit configured to:
        obtain an image information at intervals of a predetermined time, the predetermined time set by a user, while content is displayed in a first direction in a screen of the electronic device;
        identify at least two areas in the image information, the at least two areas defined based on at least one line which pass through an origin point of image information,
        identifying a face included in the image information using the image information obtained at a first interval,
        identifying a change for an angle of the face
        identify a first area that includes the face among the at least two areas,
        determine whether the face is positioned outside of the first area using the image information obtained at a second interval,
        maintain the content displayed in the first direction if the angle of the face is changed within the first area, when the face is identified among the at least two areas, and
        change the content displayed in the first direction to a second direction if the angle of the face is changed within a second area, when the face is not identified among the at least two areas.

11. The electronic device of claim 10, further comprising a touch screen configured to display a message about whether a smart rotation function is set and allow the user to select a certain area included in the message, wherein the processor unit is configured to verify that the smart rotation function is set.

12. The electronic device of claim 11, wherein the processor unit is configured to verify that the smart rotation function is set and stop operations of a gyro sensor and an acceleration sensor.

13. The electronic device of claim 12, wherein the smart rotation function is a function for rotating the screen of the electronic device, such that the user watches the screen straight.

14. The electronic device of claim 11, wherein the smart rotation function is a function for rotating the screen of the electronic device, such that the user watches the screen straight.

15. The electronic device of claim 10, wherein the processor unit is configured to verify that a smart rotation function is set and wherein the memory includes a camera module configured to photograph an image to obtain the image information in a predetermined direction.

16. The electronic device of claim 10, wherein the memory includes a face recognition module configured to verify positions of one or more eyes, a nose, and a mouth of the face.

17. The electronic device of claim 10, wherein the processor unit is configured to take a central coordinate of a line segment that connects both end points of lips of the identified face as a starting point, take a central coordinate of a line segment which connects two eyes of the identified face as an end point, display a virtual arrow in a direction from the starting point to the end point, and detect a direction of the virtual arrow.

18. The electronic device of claim 17, wherein the processor unit is configured to determine whether the direction of the virtual arrow is included in the first area, not rotate the content in the screen when the direction of the virtual arrow is included in the first area, and rotate the content in the screen when the direction of the virtual arrow is included in the second area.

* * * * *